Patented Mar. 24, 1925.

1,530,683

UNITED STATES PATENT OFFICE.

LOGAN L. MALLARD, OF NORFOLK, VIRGINIA.

PAINT-REMOVING COMPOSITION AND PROCESS OF MAKING THE SAME.

No Drawing. Application filed May 29, 1923. Serial No. 642,349.

*To all whom it may concern:*

Be it known that I, LOGAN L. MALLARD, a citizen of the United States, residing at Norfolk, in the county of Norfolk and State of Virginia, have invented certain new and useful Improvements in Paint-Removing Compositions and Processes of Making the Same, of which the following is a specification.

This invention relates to compositions for removing paint from coated surfaces.

An important object of my invention is to provide a paint removing composition adapted to more readily and completely remove paint than prior compositions intended for the same purpose.

Another object of my invention is to provide a paint removing composition adapted for removing paints, enamels, varnishes and the like, irrespective of the composition of the coating material whereby a single composition is adapted for use in removing paints, enamels, varnishes and the like of any character.

A further object of this invention is to provide a paint removing composition which is inexpensive to manufacture, not injurious to the skin and which in use, does not give off fumes detrimental to health so that the composition may be satisfactorily used indoors.

Heretofore aqueous solutions of alkali metal and alkaline earth metal hydroxids, and carbonates have been employed for the removal of paint, either alone or in association with an organic acid or an organic acid and a volatile solvent and such compositions have been found to be quite satisfactory for removing certain commonly used paints, varnishes and the like, particularly when applied in a heated condition. Now I have discovered that the efficiency of such compositions containing caustic alkali and an organic acid is materially improved by the addition to an aqueous solution containing the same, of calcium carbid. In the use of calcium carbid in accordance with my invention it is added to an aqueous solution of caustic alkali and a suitable organic acid, either with or without other materials and, when the resulting reaction is completed and the composition allowed to cool, a volatile solvent may advantageously be added thereto.

In the practice of my invention in preparing a paint removing composition of intensive activity for use on ordinary paints and varnishes such as is used on houses, furniture, automobiles and the like, I prefer to employ sodium hydroxid, sodium carbonate, oxalic acid and borax, in the preferred proportions of 16 parts by weight of sodium hydroxid, 32 parts by weight of sodium carbonate, 6 parts by weight of oxalic acid and 10 parts by weight of borax. The mixture is dissolved in a desired quantity of water depending upon the strength of the solution to be obtained. I ordinarily dissolve the mixture in approximately 10 gallons of water. To this mixture I then add calcium carbid, preferably using about 4 pounds of the carbid. When the resulting reaction is complete and the mixture has cooled to not above blood temperature I add a volatile solvent preferably benzol or gasoline ordinarily making use of about four pounds of such solvent. To the mixture is then added a pulverized starchy material, preferably starch or flour in such proportions as to make a thick paste which when thinly applied on a vertical surface will maintain its position thereon.

This composition is used by being applied in a thin coating on the paint, varnish or the like to be removed and allowed to remain thereon until the paint is softened and ready for removal whereupon the paint and paint removing paste are removed together by the application of water, preferably by being sprayed thereon from a nozzle. A single application of the paint removing paste is ordinarily sufficient to remove paint from any surface coated therewith.

The composition above set forth is rapid and effective in its action and is suitable for the removal of most of the paints, enamels, varnishes and the like now in common use but not all paints, enamels, varnishes and the like will readily yield to treatment with this composition. In order to provide a composition which is adapted for use on any paints, enamels, varnishes and the like, I employ in addition to the materials hereinbefore mentioned, Epsom salts, sal-ammoniac, copper sulfate, alcohol, either wood alcohol or denatured alcohol, preferably the latter, and ethyl ether.

In making this composition I prefer to employ the materials in the following proportions:

|  | Pounds. |
|---|---|
| Sodium hydroxid | 16 |
| Sodium carbonate | 32 |
| Oxalic acid | 6 |
| Borax | 10 |
| Calcium carbid | 4 |
| Epsom salts | 1 |
| Sal-ammoniac | 2 |
| Copper sulfate | 4 |
| Benzol or gasoline | 4 |
| Alcohol | 4 |
| Ethyl ether | 4 |

The benzol or gasoline, the alcohol and the ether are not added to the composition until after a solution in water has been made, the calcium carbid added to the solution as above described and the resulting solution allowed to cool to not above blood heat. The benzol or gasoline, the alcohol and the ether are then added and the mixture or solution thickened with the finely divided starchy material added thereto.

I have found it advantageous in the use of starch or flour to first mix the same with a small amount of water to form a thick homogeneous paste free from lumps. This can advantageously be added to the mixture containing the other ingredients of my composition while mechanically stirring the same.

The chemical effect of the addition of the calcium carbid is not understood. It has been found, however, that the effect of the calcium carbid is different from that of calcium hydroxid and that the use of calcium carbid results in the production of a paint removing composition of superior quality and greater effectiveness.

In place of oxalic acid I have found that some measure of success may be obtained by the use of other organic acids, as for example, acetic acid and that the soluble salts of such acids can be used. Similarly I have found that a considerable measure of success may be obtained by the substitution of trisodium phosphate for the sal-ammoniac. These materials are therefore to be regarded as chemical equivalents in the practice of my invention.

While I prefer to employ a pulverized starchy material to maintain my composition in contact with the paint to be removed, the composition with the starchy material omitted can be satisfactorily employed.

While I have described in detail the preferred form of my invention and preferred proportions of materials used it will be understood that my invention is not limited to the particular proportions set forth nor to the details of procedure in the production of my improved paint removing composition.

Having described my invention, I claim:

1. The herein described paint removing composition comprising an aqueous solution of approximately 16 parts by weight of sodium hydroxid, 32 parts by weight of sodium carbonate, 6 parts by weight of oxalic acid and 10 parts by weight of borax, and the products of the reaction of approximately 4 parts by weight of calcium carbid on the said solution, said solution having approximately 4 parts by weight of benzol mixed therewith, the mass being thickened by a pulverized starchy material.

2. The herein described paint removing composition comprising an aqueous solution of sodium hydroxid, sodium carbonate, oxalic acid, borax, Epsom salts, sal-ammoniac and copper sulfate and the products of the reaction of calcium carbid on the said solution.

3. The herein described paint removing composition comprising an aqueous solution of approximately 16 parts of sodium hydroxid, 32 parts of sodium carbonate, 6 parts of oxalic acid, 10 parts of borax, 1 part of Epsom salts, 2 parts of sal-ammoniac, and 4 parts of copper sulfate, and the products of the reaction of approximately 4 parts by weight of calcium carbid thereon, the resulting solution having mixed therewith approximately 4 parts of benzol, 4 parts of alcohol and 4 parts of ethyl ether, the proportions being by weight.

4. The herein described paint removing composition comprising an aqueous solution of approximately 16 parts of sodium hydroxid, 32 parts of sodium carbonate, 6 parts of oxalic acid, 10 parts of borax, 1 part of Epsom salts, 2 parts of sal-ammoniac, and 4 parts of copper sulfate, and the products of the reaction of approximately 4 parts by weight of calcium carbid thereon, the resulting solution having mixed therewith approximately 4 parts of benzol, 4 parts of alcohol and 4 parts of ethyl ether, the proportions being by weight, the mass being thickened by a pulverized starchy material.

5. The herein described process of making a paint removing composition comprising dissolving in water a caustic alkali and a suitable organic acid and adding calcium carbid thereto.

6. The herein described process of making a paint removing composition comprising dissolving in water sodium hydroxid, sodium carbonate and oxalic acid and adding calcium carbid thereto.

7. The herein described process of making a paint removing composition comprising dissolving in water sodium hydroxid, sodium carbonate and oxalic acid, adding calcium carbid thereto, allowing the mass to cool and adding a volatile solvent thereto.

8. The herein described process of making a paint removing composition comprising dissolving in water sodium hydroxid, sodium carbonate and oxalic acid, adding calcium carbid thereto, allowing the mass to cool, and adding benzol thereto.

9. The herein described process of making a paint removing composition comprising dissolving in water sodium hydroxid, sodium carbonate and oxalic acid, adding calcium carbid thereto, allowing the mass to cool, adding benzol thereto and thickening the resulting mixture with a pulverized starchy material.

In testimony whereof I affix my signature.

LOGAN L. MALLARD.